Patented Sept. 26, 1950

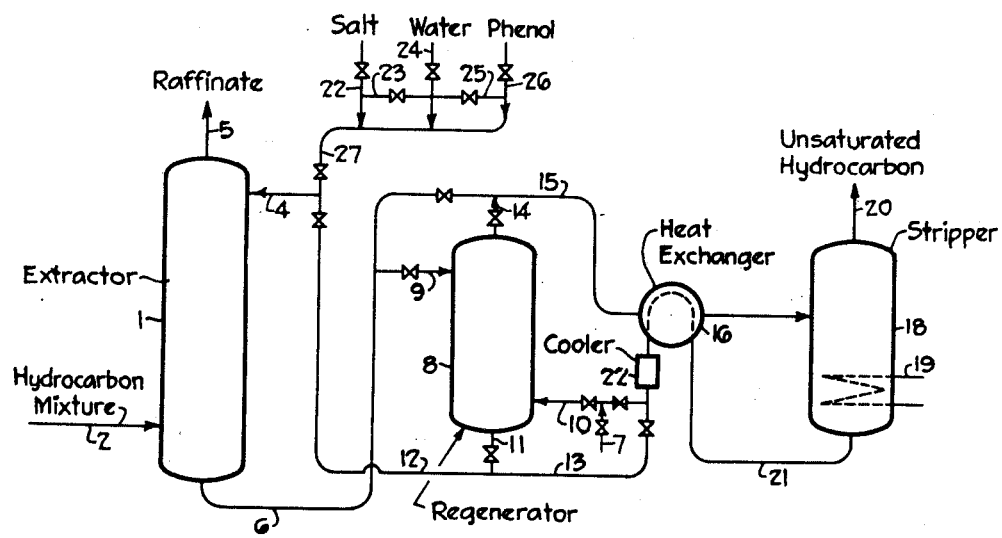

2,523,681

UNITED STATES PATENT OFFICE 2,523,681

SOLVENT EXTRACTION OF UNSATURATED HYDROCARBONS

Robert M. Cole, Oakland, Calif., assignor to Shell Development Company, San Francisco, Calif., a corporation of Delaware Application September 22, 1947, Serial No. 775,456

11 Claims. (Cl. 260—677)

This invention relates to the separation and concentration of unsaturated from less unsaturated hydrocarbons, and is particularly applicable to the separation and concentration of olefins from fluid hydrocarbon mixtures.

Processes for separating olefins from hydrocarbon mixtures by contacting the mixtures with solutions of heavy metal salts capable of forming reversible complexes with said olefins, whereby said olefins are extracted by said solution, have been described. The presence of a neutral water-soluble organic compound, such as ethylene glycol, has been stated to increase olefin absorption. However, the presence of the heretofore described solutizers, as has been found, does not increase absorption, while maintaining high selectivity, to the extent desired for commercial operations.

It is therefore an object of the present invention to provide an improved process for the separation of unsaturated hydrocarbons from fluid hydrocarbon mixtures containing them. A further object is to separate unsaturated hydrocarbons from less unsaturated hydrocarbons. Another object is to provide an improved process for separating olefins from olefinic cracked hydrocarbon mixtures. A still further object is to separate olefins, in substantially pure form, from other hydrocarbons. Still another object is to provide for the storage and transportation of normally gaseous unsaturated hydrocarbons. Further objects and advantages of the present invention will be readily apparent from the following description.

It has now been found that the addition of phenol to an aqueous solution of a water soluble silver salt, such as silver nitrate, greatly increases the absorption of olefins therein, while the high selectivity of the absorbing solution for olefins over saturated hydrocarbons remains substantially unaffected. The present invention, therefore, provides an improved method of increasing the solubility of hydrocarbons in aqueous silver salt solutions without loss of olefinic selectivity, as fully described hereinafter. There may be some doubt as to whether the absorption of unsaturated hydrocarbons, as herein described, is physical or due to the formation of a complex material between the unsaturated hydrocarbon and one or more components of the solution, and it is not desired that the present invention be limited by any theory relative thereto. By "absorption," "extraction," and terms of similar import, as used herein, is meant the taking up of the unsaturated hydrocarbon by the solution irrespective of the exact mechanism thereof.

The present invention provides a process for the separation and concentration of unsaturated hydrocarbons from fluid mixtures containing them, which process comprises contacting said fluid mixtures containing unsaturated hydrocarbons with a solution of a silver salt in water and a phenol, thereby absorbing or dissolving the unsaturated hydrocarbon in said solution, and separating the resulting solution containing the unsaturated hydrocarbon from the remaining unabsorbed components of said mixture. The present invention may be employed in connection with the separation and concentration of many different unsaturated hydrocarbons from a variety of fluid mixtures containing them. The term "fluid," as used herein, is meant to include both gases and liquids. For example, in one embodiment, the invention may be employed for the separation of olefins such as ethylene, propylene and butylene from gaseous hydrocarbon mixtures, or such gaseous mixtures may be liquefied as by compression and the olefins separated from the liquefied mixture. Another embodiment of the present invention contemplates the separation of normally liquid unsaturated hydrocarbons, such as pentenes, hexenes, heptenes, cyclopentenes, cyclohexenes, and the like, from liquid mixtures containing them. The invention may also be used to separate aromatic compounds containing an unsaturated aliphatic side chain from the corresponding saturated compound, the aromatic ring being considered to be saturated in the sense of the term as used herein and in the appended claims; or from other saturated compounds, such as the separation of styrene from ethyl benzene. Unsaturated hydrocarbons may also be separated from nonhydrocarbons, such as thiophene, furan, pyrrole, ethers, thioethers, their derivatives, and the like, in accordance with the present invention. A further application of the present invention is the separation and concentration of unsaturated from less unsaturated hydrocarbons, such as the separation of cyclopentadiene from cyclopentene, or the separation of butadiene from butylene, and the separation of acetylenic hydrocarbons from mixtures containing them.

The present invention is especially applicable to the separation of olefins from hydrocarbons of the gasoline range obtained by thermal or catalytic cracking of various petroleum oils, such as crudes, residues, distillates or gases. While olefinic mixtures of hydrocarbons of various molecular weights may be treated in accordance with the present invention, mixtures of hydrocarbons having relatively small numbers of carbon atoms to the molecule, i. e., relatively low molecular weight hydrocarbons, such as for example hydrocarbons of from 2 to 8 carbon atoms, are especially suitable for employment therein. Thus, for example, the process of the present invention may be used to treat mixtures of hydrocarbons having from 2 to 8 carbon atoms and containing the desired olefins, which mixtures may be obtained, for example, by the vapor phase cracking of petroleum oils.

In accordance with the present invention, a hydrocarbon fluid containing one or more unsaturated hydrocarbons, such as olefins, is contacted with a solution containing a water soluble silver salt, water and phenol. It has been found that such solutions absorb surprisingly large amounts of olefins. For example, phenol-solutized aqueous silver nitrate solutions absorb from about 10 to 20%, or more, of their own volume of 5 carbon atom olefins, whereas the same solutions solutized with ethylene glycol, for example, absorb only about 4% of their volume, while unsolutized aqueous solutions absorb only about 1 to 2% of their volume. Other olefins may be absorbed to an even greater extent, with the superiority of the phenol solutized solution remaining markedly predominant.

In carrying out the process of the present invention considerable latitude is permissible in the composition of the absorbing solution. Best results will be obtained, however, if the limits described below are observed. When silver nitrate, a preferred water soluble salt of the present invention is employed, it is preferred to have the silver nitrate and phenol present in such quantities that the weight ratio of silver nitrate to phenol is from about 0.4 to about 3, and in most instances excellent results are achieved when said ratio is from about 1 to about 2. At the same time the water concentration may advantageously be from about 3% to about 40% by weight of the absorbing solution, and preferably from about 10% to about 22% by weight. The quantity of water present may be varied, but is preferably kept as small as is consistent with the solubility of silver nitrate in the mixture. For example, with a weight ratio of silver nitrate to phenol of 1 the quantity of water present may advantageously be about 10 to 12% by weight of the absorbing solution. As the silver nitrate to phenol ratio is decreased, the water concentration may be decreased, e. g., at a ratio of 0.5, the water concentration may advantageously be about 5% by weight and high absorption of olefins obtained. Even though the selectivity for olefins may decrease at relatively low water concentrations, in many instances the decrease in selectivity is negligible. Conversely, if the silver nitrate to phenol weight ratio is increased, the water concentration may also be increased, so that at a ratio of 2, the water concentration may advantageously be from about 19 to about 22% by weight.

In the preceding description of preferred compositions for the extracting solution of the present invention, silver nitrate is described as a preferred water soluble silver salt for use therein. As illustrative of other water soluble silver salts which may be employed may be mentioned the fluosilicate, perchlorate, fluoride, lactate, and acetate salts.

Any suitable type of apparatus may be employed in carrying out the process of the present invention for effecting the desired separation, which may be adapted to batch, intermittent, or continuous operation. After contacting the fluid hydrocarbon mixture with the absorbing solution, the resulting raffinate and extract phases are separated, and the unsaturated hydrocarbon recovered from the extract phase. The unsaturated hydrocarbon recovery and regeneration of the extracting solution may be conveniently accomplished in one operation, such as by heating or reducing the pressure, or both, in order to distill off and/or desorb the absorbed unsaturated hydrocarbon, or by extraction of the unsaturated hydrocarbon with a second solvent which is substantially immiscible with the extracting solvent, and which may be subsequently separated from the unsaturated hydrocarbon, as for example by distillation. A suitable second solvent for such an operation, for example, is n-octane, which may be employed for extraction of unsaturated hydrocarbons in most instances.

The optimum temperature to be employed in the extraction step varies with the particular compound to be treated, and may range up to about 150° F. or more, but in most instances temperatures below 80° F., and particularly those in the range of from about 32 to about 80° F. are suitable. At the relatively lower temperatures less phenol will be lost to the raffinate phase, but in any event such loss is usually slight. In general, atmospheric pressures are contemplated for use in the unsaturated hydrocarbon absorption step of the process of the present invention, especially where the fluid hydrocarbon being treated is a liquid under the conditions of the process, but sub- or super-atmospheric pressures may be employed where desirable.

As illustrative of a preferred embodiment of the present invention, a mixture of olefins and paraffins obtained from the thermal or catalytic cracking of a petroleum oil, wherein preferably the olefin contains from about 2 to 8 carbon atoms, or mixtures thereof, is contacted with an aqueous silver nitrate solution solutized with phenol, containing silver nitrate and phenol in quantities such that the weight ratio of silver nitrate to phenol is from about 0.4 to about 3, and preferably from about 1 to about 2, and containing from about 3% to about 40% by weight of water, and preferably from about 10% to about 22% by weight of water. In carrying out the process of the present invention, the volume of hydrocarbon per volume of extracting solution employed may be varied considerably, the optimum value depending largely on the composition of the hydrocarbon mixture and the various operating conditions, but in most instances the volume ratio of hydrocarbon to extracting solution may advantageously be from about 0.1 to about 1. The temperature of the extraction step is preferably within the range of from about 32 to about 80° F., but the increase of absorption with decrease in temperature is not marked, and hence the economics of the process will usually dictate the use of ambient or atmospheric temperature. After contacting the hydrocarbon and extracting solution, whether the process be of batch, intermittent or continuous type, the raffinate and extract phases are separated, the olefins recovered from the extract phase, preferably by distillation or solvent extraction, and the regenerated extracting solution recycled in the process.

The present invention may be better understood from a consideration of the accompanying flow diagram which represents an embodiment of the present invention wherein a fluid hydrocarbon mixture containing the unsaturated hydrocarbon(s) to be separated is introduced into an extractor 1 (provided for intimately contacting counter-flowing immiscible fluids) via line 2, while the extracting solution (solvent) is introduced into the extractor via line 4. The hydrocarbon(s) mixture passes upward in countercurrent flow to the extracting solution, with the raffinate leaving the extractor via line 5. The first extract, which comprises the extracting solution (solvent) containing the extracted unsaturated hydrocarbon(s), passes out of the extractor via line 6 and, where the unsaturated hydrocarbon(s) is stripped by a second solvent therefor, the first extract is passed into regenerator 8 via line 9. The second solvent, which is substantially immiscible with the extracting solution, is introduced into regenerator 8 via line 10. The extracting solution of the first extract, flowing countercurrently to the second solvent, is stripped of the unsaturated hydrocarbon(s), then passes out of the regenerator via line 11, and is recycled to the extractor via lines 11, 12 and 4. The second or stripping solvent containing the unsaturated hydrocarbon(s) passes from the regenerator via lines 14 and 15, through heat exchanger 16, and into a suitable stripper 18 fitted with heating means 19, such as a steam coil or the like. The unsaturated hydrocarbon(s) is stripped from the second solvent and passes from the stripper via line 20, and may be stored or may be otherwise treated, e. g., reacted to form derivatives thereof. The regenerated second solvent is recycled from the stripper into the regenerator via line 21, heat exchanger 16, cooler 22 if desired (which may be operated by any convenient means, such as by cooling with water) and line 10. When necessary or desirable, additional second solvent may be introduced into the system via lines 7 and 10.

When a second solvent is not employed, and the unsaturated hydrocarbon(s) is stripped from the extracting solution by heat, the regenerator 8 is by-passed, the extracting solution passing from the extractor 1 via lines 6 and 15, through heat exchanger 16, and into stripper 18, where the unsaturated hydrocarbon(s) is stripped by heat, and leaves the stripper via line 20. The regenerated extracting solution is recycled from the stripper to the extractor via line 21, heat exchanger 16, cooler 22, and lines 13, 12 and 4. When it is necessary or desired to adjust or change the composition of the extraction solution, silver salt, water and phenol may jointly or individually be introduced into the extracting solution via lines 22, 23, 24, 25, 26 and 27.

Various modifications in the above described apparatus and process may of course be employed, such as recycling the raffinate through at least a portion of the extractor in order to obtain an especially pure raffinate. For purposes of simplicity, pumps, temperature controls, control means, additional heat exchangers, and the like, the proper placement of which is evident to those skilled in the art, have been largely omitted.

The main object of the present invention, the separation of unsaturated from less unsaturated hydrocarbons, has been described. It has also been found that the present invention may be employed to separate various classes of olefins. Thus, cyclic olefins are selectively absorbed from non-cyclic olefins, and olefins having the double bond in the alpha position are selectively absorbed from those wherein the double bond is in a different position, such as the beta position, while methyl and higher alkyl substituents on carbon atoms attached to the olefinic bond somewhat reduces selectivity. For example, cyclopentene is absorbed selectively over straight chain 5 carbon atom olefins, 5 carbon atom olefins having the double bond in the alpha position are absorbed selectively over those with the double bond in the beta position, while a methyl substituent on a carbon atom involved in the olefinic bond somewhat decreases selectivity.

By carrying out the process of the present invention, as herein described, surprisingly large amounts of olefin are absorbed per unit of solvent, which olefin may be easily recovered in substantially pure form. The extracting solution, after removal of the olefin, is recycled in the process, and is quite stable, when the herein described operating conditions are observed, only small losses of silver and phenol occurring, which, of course, may be recovered if desired.

Various modifications of the present invention, as herein described, may be employed, such as recycling the extracted hydrocarbon in order to obtain an especially purified product, as above mentioned. This modification is especially desirable where a more unsaturated hydrocarbon is separated from a less unsaturated hydrocarbon, since, although the more unsaturated hydrocarbon is preferentially extracted, some of the less unsaturated hydrocarbon will be also extracted, and recycling a portion of the extracted material is desirable in order to obtain substantial purity of the product. These and other modifications are within the scope of the present invention.

A further important embodiment of the present invention is to provide for the storage and transportation of unsaturated hydrocarbons. Since the lower unsaturated hydrocarbons are gases at ordinary temperatures, and expand with increasing temperatures, it has been customary to employ strong and necessarily heavy containers for their storage and transportation. Due to the great solubility of unsaturated hydrocarbons in solutions of water-soluble silver salts in water and phenol, as herein described, such unsaturated hydrocarbons may conveniently be stored and transported while dissolved in said solutions. For example, a solution of silver nitrate in phenol and water may be placed in a suitable container, and a lower olefin, i. e., an olefin that is gaseous at ordinary temperatures and pressures, is introduced therein. It is usually advantageous to store the gas at a somewhat elevated pressure, since more will be dissolved thereby. The compositions of the absorbing solutions may be the same as those used for the separation of unsaturated hydrocarbons as herein described. Pressures up to about 10 atmospheres generally are suitable, though high pressures may be employed if desired. When it is desired to recover the gas, it may be easily removed from the solution by heating and/or reducing the pressure, or by extracting with a solvent therefor which is immiscible in the solution. Solutions of unsaturated hydrocarbons in the solvents of the present invention, therefore, constitute new and useful compositions of matter.

The following examples illustrate the present invention, which is not to be considered as limited thereby:

EXAMPLE I

Separate samples of mixtures of 5 carbon atom hydrocarbons containing 38.5% by volume of olefins and 61.5% by volume paraffins, and samples of a mixture of 6 and 7 carbon atom hydrocarbons containing 36.7% by volume olefins, 57.5% by volume paraffins, and 5.8% by volume of aromatic compounds, were contacted with silver nitrate-phenol-water solutions of varying composition. All extractions were at atmospheric pressure and at the indicated temperatures. The compositions of the extracting solutions and results obtained are shown in Table I.

*Table I*

| Extracting Solution, per cent by weight | | | Olefin | Volume Ratio Hydrocarbon to Extracting Solution | Absorption of olefins, per cent by volume of extracting solutions | | | |
|---|---|---|---|---|---|---|---|---|
| AgNO₃ | Phenol | H₂O | | | 32° F. | 40° F. | 60° F. | 80° F. |
| 56.6 | ----- | 43.4 | C₅ | 0.14 | ---- | ---- | 1.7 | 1.4 |
| 39 | 57 | 4 | C₅ | 0.57 | 16 | 15.7 | 15.0 | 14.3 |
| 42 | 50 | 8 | C₅ | 0.44 | ---- | ---- | 11.8 | 11.5 |
| 41 | 42 | 17 | C₅ | 0.38 | 11 | 10.7 | 10.1 | ---- |
| 53 | 25 | 22 | C₅ | 0.37 | 8.8 | 8.4 | 7.6 | 7.0 |
| 20 | 61 | 19 | C₅ | 0.48 | 8.4 | 8.0 | 7.3 | ---- |
| 27 | 45 | 25 | C₅ | 0.27 | 6.8 | 6.5 | 5.9 | ---- |
| 25 | 35 | 40 | C₅ | 0.32 | ---- | 4.0 | 3.4 | ---- |
| 36.6 | ----- | 43.4 | C₆₋₇ | 0.14 | ---- | 0.7 | 0.5 | 0.4 |
| 42 | 50 | 8 | C₆₋₇ | 0.50 | ---- | ---- | 9.5 | 9.0 |

These data demonstrate the value of phenol as a solutizer for aqueous silver nitrate solutions, that the compositions of the extracting solutions containing phenol may vary rather widely and good results achieved therewith, that the temperature of extraction may vary over a wide range without significantly adversely affecting results, and that high olefin extraction is favored by low water concentrations.

In other similar experiments, but with the substitution of other materials, including methanol, isopropanol, diacetone alcohol, ethanolamine nitrate, acetonitrile, ethylene glycol, and glycerine for the phenol, with other experimental conditions comparable, the extracting powers of the solutions were greatly inferior to those obtained with phenol.

EXAMPLE II

A catalytically cracked gasoline consisting chiefly of five-carbon hydrocarbons containing about 42 percent by volume of five-carbon olefins was contacted with silver nitrate-phenol-water solutions of the compositions indicated in Table II. The extractions were performed at atmospheric pressure and 60° F., with gasoline to extractive solvent volume ratios of from 0.15 to 0.40. The results are shown in Table II:

*Table II*

| Solvent Composition | | Olefins Absorbed, Volume Per cent of solvent | Purity of olefins absorbed, Per cent |
|---|---|---|---|
| Water, Per cent by wt. | Silver nitrate to Phenol wt. ratio | | |
| 12 | 1.0 | 11.42 | 95.1 |
| 16.2 | 1.0 | 8.74 | 97.0 |
| 21.6 | 1.0 | 7.15 | 95.5 |
| 29.4 | 1.0 | 5.56 | 95.5 |
| 40.3 | 1.0 | 3.32 | 94.2 |
| 15 | 0.42 | 5.07 | 76.6 |
| 4 | 0.68 | 14.9 | 85.2 |
| 8 | 0.84 | 11.8 | 89.6 |
| 22 | 2.12 | 7.5 | 95.8 |

These data show the value of employing a solvent with relatively small amounts of water, a small but noticeable decrease in the selectivity of absorption at low silver nitrate to phenol ratios, and generally high olefin absorption and selectivity.

EXAMPLE III

Butadiene was absorbed in a 5 normal (about 50% by weight) aqueous silver nitrate solution at 85° F.; the volume percent increase on saturation with butadiene was 13.1.

Butadiene was absorbed in a solution containing 40% by weight silver nitrate, 40% by weight phenol, and 20% by weight water at 80° F.; the volume percent increase on saturation with butadiene was 26.1, or about 100% more than with unsolutized aqueous silver nitrate.

I claim as my invention:

1. A process for the separation of olefins from paraffins which comprises contacting a fluid hydrocarbon mixture containing olefinic and paraffinic hydrocarbons with a solution of silver nitrate in water and phenol wherein the silver nitrate and phenol are present in weight ratio of silver nitrate to phenol of from about 1 to about 2, and containing from about 10% to about 22% by weight of water, respectively.

2. A process for the separation of olefins from paraffins which comprises contacting a mixture containing olefinic and paraffinic hydrocarbons with a solution of silver nitrate in water and phenol, wherein the silver nitrate and phenol are present in weight ratio of silver nitrate to phenol of from about 0.4 to about 3 and containing from about 3% to about 40% by weight of water selected so that the solution is substantially saturated with respect to the silver salt.

3. A process for the separation of olefins from a hydrocarbon fraction within the gasoline boiling range and containing both olefinic and paraffinic hydrocarbons which comprises contacting said hydrocarbon fraction with a homogeneous aqueous-phenolic solution of silver nitrate wherein the silver nitrate and phenol are present in weight ratio of silver nitrate to phenol of from about 2:3 to about 1:1 and the water is present in the proportions of from about 4% to about 12% by weight of the solution, respectively.

4. A process for the separation of olefins from paraffins which comprise contacting a fluid mixture containing olefinic and paraffinic hydrocarbons with a homogeneous-aqueous phenol solution of a water-soluble silver salt selected from the group consisting of silver nitrate, silver fluosilicate, silver fluoride, silver perchlorate, silver lactate and silver acetate, wherein the silver salt and phenol are present in weight ratio of silver salt to phenol of from about 0.4 to about 3 and the solution contains from about 3% to about 40% by weight of water selected so that the solution is substantially saturated with respect to the silver salt.

5. A process for the separation of butadiene from a hydrocarbon mixture of butadiene and less unsaturated hydrocarbons which comprises contacting said mixture with a homogeneous aqueous-phenol solution of silver nitrate, said solution containing silver nitrate, phenol and water in the proportions by weight, respectively, of about 40:40:20.

6. A process for the separation of unsaturated hydrocarbons from a hydrocarbon mixture containing the same which comprises; contacting said hydrocarbon mixture with a homogeneous aqueous-phenol solution of a water-soluble silver salt selected from the group consisting of silver nitrate, silver fluosilicate, silver fluoride, silver perchlorate, silver lactate and silver acetate wherein the silver salt and phenol are present in the weight ratio of silver salt to phenol of about 1 and said solution contains about 10 to 12% by weight water.

7. A process for the separation of unsaturated hydrocarbons from a hydrocarbon mixture containing the same which comprises; contacting said hydrocarbon with a homogeneous aqueous-phenol solution of a water-soluble silver salt selected from the group consisting of silver nitrate, silver fluosilicate, silver fluoride, silver perchlorate, silver lactate and silver acetate wherein the silver salt and phenol are present in the weight ratio of silver salt to phenol between about 0.4 and about 3 and said solution is substantially saturated with respect to the silver salt.

8. A process for the separation of unsaturated hydrocarbons from a hydrocarbon mixture containing the same which comprises; contacting said hydrocarbon with a homogeneous aqueous-phenol solution of a water-soluble silver salt selected from the group consisting of silver nitrate, silver fluosilicate, silver fluoride, silver perchlorate, silver lactate and silver acetate wherein the silver salt and phenol are present in the weight ratio of silver salt to phenol between about 0.4 and about 1 and said solution is substantially saturated with respect to the silver salt.

9. A process for the separation of unsaturated hydrocarbons from a fluid hydrocarbon mixture containing the same and less unsaturated hydrocarbons which comprises; contacting said hydrocarbon mixture with a homogeneous aqueous-phenol solution of silver nitrate wherein the weight ratio of silver nitrate to phenol is about 1 and said solution contains about 10 to 12% by weight water.

10. A process for the separation of unsaturated hydrocarbons from a fluid hydrocarbon mixture containing the same and less unsaturated hydrocarbons which comprises; contacting said hydrocarbon mixture with a homogeneous aqueous-phenol solution of silver nitrate wherein the weight ratio of silver nitrate to phenol is between about 0.4 and about 3 and said solution is substantially saturated with respect to silver nitrate.

11. A process for the separation of unsaturated hydrocarbons from a fluid hydrocarbon mixture containing the same and less unsaturated hydrocarbons which comprises; contacting said hydrocarbon mixture with a homogeneous aqueous-phenol solution of silver nitrate wherein the weight ratio of silver nitrate to phenol is between about 0.4 and about 1 and said solution is substantially saturated with respect to silver nitrate.

ROBERT M. COLE.

REFERENCES CITED

The following references are of record in the file of this patent:

UNITED STATES PATENTS

| Number | Name | Date |
|---|---|---|
| 2,139,000 | Cohen | Dec. 6, 1938 |
| 2,235,119 | Robey | Mar. 18, 1941 |
| 2,246,257 | Kohn | June 17, 1941 |
| 2,391,404 | Friedman et al. | Dec. 25, 1945 |
| 2,395,957 | Breuer | Mar. 5, 1946 |
| 2,407,820 | Durrum | Sept. 17, 1946 |
| 2,463,482 | Francis | Mar. 1, 1949 |